US006580976B1

(12) United States Patent
Belcea

(10) Patent No.: US 6,580,976 B1
(45) Date of Patent: Jun. 17, 2003

(54) METHODS AND APPARATUS FOR VERY CLOSE FOLLOWING TRAIN MOVEMENT

(75) Inventor: John Martin Belcea, West Melbourne, FL (US)

(73) Assignee: GE Harris Railway Electronics, LLC, Melbourne, FL (US)

(*) Notice: Subject to any disclaimer, the term of this patent is extended or adjusted under 35 U.S.C. 154(b) by 0 days.

(21) Appl. No.: 09/752,108

(22) Filed: Dec. 29, 2000

Related U.S. Application Data

(60) Provisional application No. 60/173,842, filed on Dec. 30, 1999.

(51) Int. Cl.[7] ............................................. B60T 13/00
(52) U.S. Cl. ........................ 701/20; 701/96; 701/301; 701/200; 340/988
(58) Field of Search ........................... 701/20, 200, 96, 701/93, 301; 340/988; 180/170

(56) References Cited

U.S. PATENT DOCUMENTS

| | | | | |
|---|---|---|---|---|
| 3,967,801 A | * | 7/1976 | Baughman | 246/182 R |
| 4,026,506 A | * | 5/1977 | Bourke et al. | 246/187 B |
| 4,095,764 A | * | 6/1978 | Osada et al. | 104/298 |
| 5,366,183 A | * | 11/1994 | Gill | 246/187 R |
| 5,724,243 A | | 3/1998 | Westerlage et al. | |
| 5,757,291 A | * | 5/1998 | Kull | 246/122 R |
| 5,802,492 A | | 9/1998 | DeLorme et al. | |
| 5,903,517 A | * | 5/1999 | Futsuhara et al. | 367/120 |
| 5,954,780 A | * | 9/1999 | Jang | 701/20 |
| 5,964,313 A | | 10/1999 | Guy | |
| 5,969,643 A | * | 10/1999 | Curtis | 340/933 |
| 5,983,161 A | * | 11/1999 | Lemelson et al. | 340/436 |
| 5,987,377 A | | 11/1999 | Westerlage et al | |
| 6,009,357 A | | 12/1999 | Wellman et al. | |
| 6,032,097 A | * | 2/2000 | Iihoshi et al. | 180/168 |
| 6,067,031 A | * | 5/2000 | Janky et al. | 180/169 |
| 6,098,780 A | | 8/2000 | Kelly et al. | |
| 6,125,311 A | | 9/2000 | Lo | |
| 6,173,231 B1 | * | 1/2001 | Chojnacki | 180/167 |
| 6,179,252 B1 | * | 1/2001 | Roop et al. | 246/122 R |
| 6,185,504 B1 | | 2/2001 | Berstis et al. | |
| 6,202,566 B1 | | 3/2001 | Hutchinson | |
| 6,216,985 B1 | | 4/2001 | Stephens | |
| 6,226,572 B1 | * | 5/2001 | Tojima et al. | 340/988 |
| 6,246,956 B1 | * | 6/2001 | Miyoshi et al. | 246/182 R |
| 6,268,804 B1 | * | 7/2001 | Janky et al. | 180/169 |
| 6,275,773 B1 | * | 8/2001 | Lemelson et al. | 340/436 |
| 6,332,107 B1 | * | 12/2001 | Gordon et al. | 246/182 A |
| 6,351,698 B1 | * | 2/2002 | Kubota et al. | 340/988 |

* cited by examiner

Primary Examiner—William A. Cuchlinski, Jr.
Assistant Examiner—Olga Hernandez
(74) Attorney, Agent, or Firm—Armstrong Teasdale LLP; Robert B. Reeser, III

(57) ABSTRACT

A method for increasing efficiency of operation of trains includes operating a plurality of trains as a moving sequence and regulating distances between the trains to eliminate distances in excess of safe minimum distances between the trains. Distance between a preceding train and a following train is regulated by varying speed of the following train to minimize an excess distance between the two trains. A safe minimum distance includes a safe braking distance for the following train. In a further embodiment the safe braking distance is determined based on train weight distribution. Distributed weight is determined using measurements of train position, speed, acceleration and tractive effort to estimate forces affecting the train. The forces are related to one another to obtain a matrix equation expressing the forces in terms of car weight and train weight. The equation is solved to determine car weight and train weight.

53 Claims, 3 Drawing Sheets

METHODS AND APPARATUS FOR VERY CLOSE FOLLOWING TRAIN MOVEMENT

CROSS REFERENCE TO RELATED APPLICATIONS

This application claims the benefit of U.S. provisional application No. 60/173,842, filed Dec. 30, 1999.

BACKGROUND OF THE INVENTION

This invention relates generally to trains, and more specifically to train operating efficiency.

Typically, in order to move freight via railway from one location to another, a long or very long train is utilized. Increasing a length of a train allows more freight to be carried without additional on-board personnel. Adding more cars, however, decreases average travel speed of the train, increases fuel consumption, and ties up sections of track for longer time periods. Increasing train length also increases braking distances and causes additional stress to couplers between cars.

It would be desirable to provide a method for increasing train freight capacity without reducing average train speed or causing additional wear to train components.

BRIEF SUMMARY OF THE INVENTION

In an exemplary embodiment, a method for increasing operation efficiency of trains includes operating a plurality of trains as a moving sequence and regulating distances between the trains to eliminate distances in excess of safe minimum distances between the trains. Distance between a preceding train and a following train is regulated by varying speed of the following train to minimize an excess distance between the two trains.

A safe minimum distance between the preceding train and the following train includes a safe braking distance for the following train. In a further embodiment a safe braking distance is determined based on train weight distribution. Distributed weight of a moving train is estimated using, at various times, measurements of train position, speed, acceleration and tractive effort to estimate forces affecting the train. At various times the forces are related to one another to obtain a matrix equation expressing the forces in terms of car weight and train weight. The matrix equation then is solved to determine car weight and train weight.

The above method increases effective track capacity and equipment utilization while reducing fuel consumption. Use of shorter trains also facilitates train handling in railroad yards and thus reduces yard operating time.

DETAILED DESCRIPTION OF THE INVENTION

Figure 1:
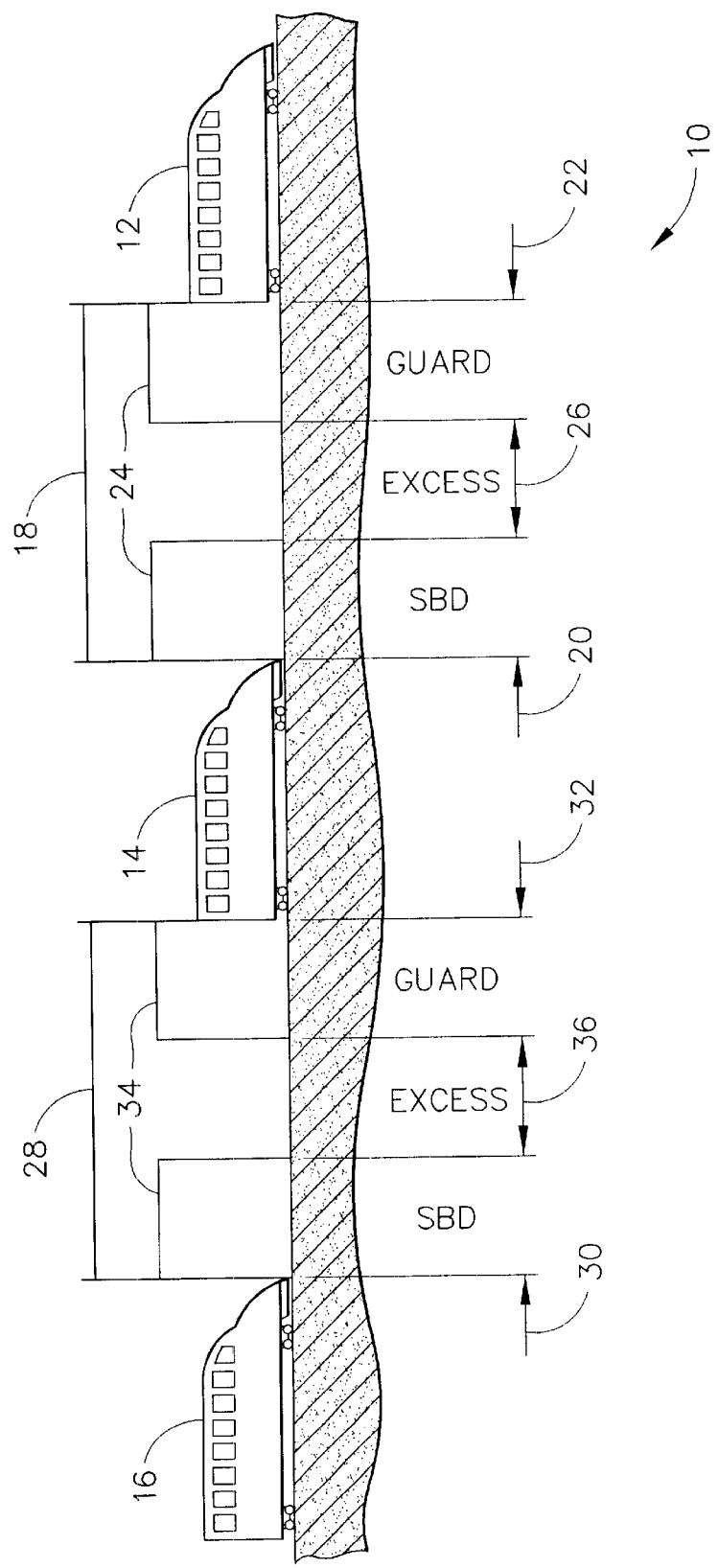
FIG. 1 illustrates a series of trains and distances between the trains.

In one embodiment, a method for increasing operation efficiency of trains includes operating a plurality of trains as a moving sequence or convoy and regulating distances between the trains to eliminate distances in excess of safe minimum distances between the trains. More particularly and referring to FIG. 1, a convoy 10 of trains includes a lead train 12 followed, for example, by trains 14 and 16. Additional trains not shown in FIG. 1 may follow train 16 in convoy 10.

As convoy 10 travels, distances between trains 12, 14 and 16 are regulated. More specifically, distances at various times between any two successive trains are regulated based on positions and speeds of the two trains. For example, a preceding train 12 and a following train 14 are separated by a distance 18 that varies according to positions and speeds of trains 12 and 14. Distance 18 includes a safe braking distance (SBD) 20 and a guard distance 22. Braking distance 20 and guard distance 22, when added together, provide a minimum safe distance 24 between trains 12 and 14.

Safe braking distance 20 is a stopping distance for train 14 following a full application of brakes on train 14. Braking distance 20 varies according to train speed, train weight, track conditions, and other factors. Train weight is determined using many methods as known to those skilled in the art, such as described in co-pending U.S. patent application Ser. No. 60/173,602, filed Dec. 29, 1999, entitled Adaptive Train Model. Alternatively and as further described below, estimates of distributed train weight are made during train travel based on measurements of tractive effort, velocity, acceleration, location and train length.

Guard distance 22 includes a safety factor, e.g., a fixed value such as 400 feet, or a percentage, e.g. 15 percent, of safe braking distance 20. As discussed below, guard distance 20 in one embodiment also includes a safety factor based on data transmission rates of a train operating system implementing the present method.

In one embodiment, a speed of following train 14 is varied based on minimum safe distance 24. For example, train speed is varied to minimize, e.g. eliminate, a distance 26 in excess of minimum safe distance 24. Distances between trains 14 and 16 are regulated in the same manner. Specifically, preceding train 14 and following train 16 are separated by a distance 28 that varies according to positions and speeds of trains 14 and 16. Distance 28 includes a safe braking distance 30 and a guard distance 32 that together provide a minimum safe distance 34 between trains 14 and 16. A speed of train 16 is varied to minimize or eliminate an excess distance 36 between trains 14 and 16.

Figure 2:
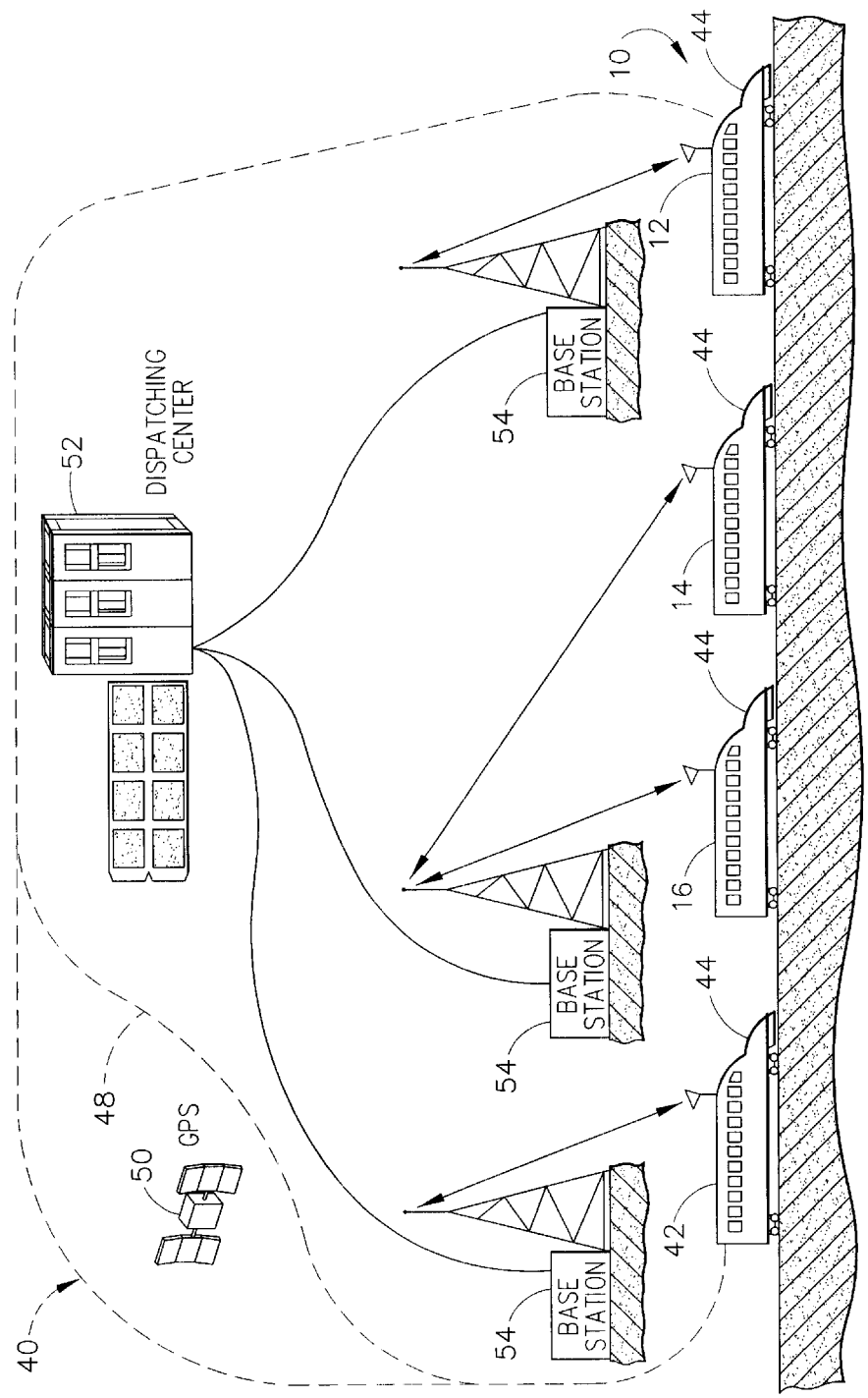
FIG. 2 illustrates one embodiment of a train operating system.

FIG. 2 shows an embodiment of a train operating system 40 implementing the above-described method. Train operating system 40 regulates convoy 10, which includes lead train 12 and other trains 14, 16 and 42, each train having a locomotive 44. Train operating system 40 regulates distances between trains 12, 14, 16 and 42 by eliminating or minimizing distances in excess of the safe minimum distances between the trains. Train operating system 40 includes, for each of trains 12, 14, 16 and 42, a processor (not shown in FIG. 2) located, for example, on board each train locomotive 44 and that interfaces with train speed controls (not shown in FIG. 2).

Train operating system 40 also includes a communications system 48 and a positioning system 50, e.g., the global positioning system known in the United States as Navstar GPS. Communications system 48 includes, for example, a dispatching center 52 and base stations 54 for propagating signals to and from dispatching center 52. Other embodiments include alternative communication configurations, including, for example, communication via an RF satellite.

Figure 3:
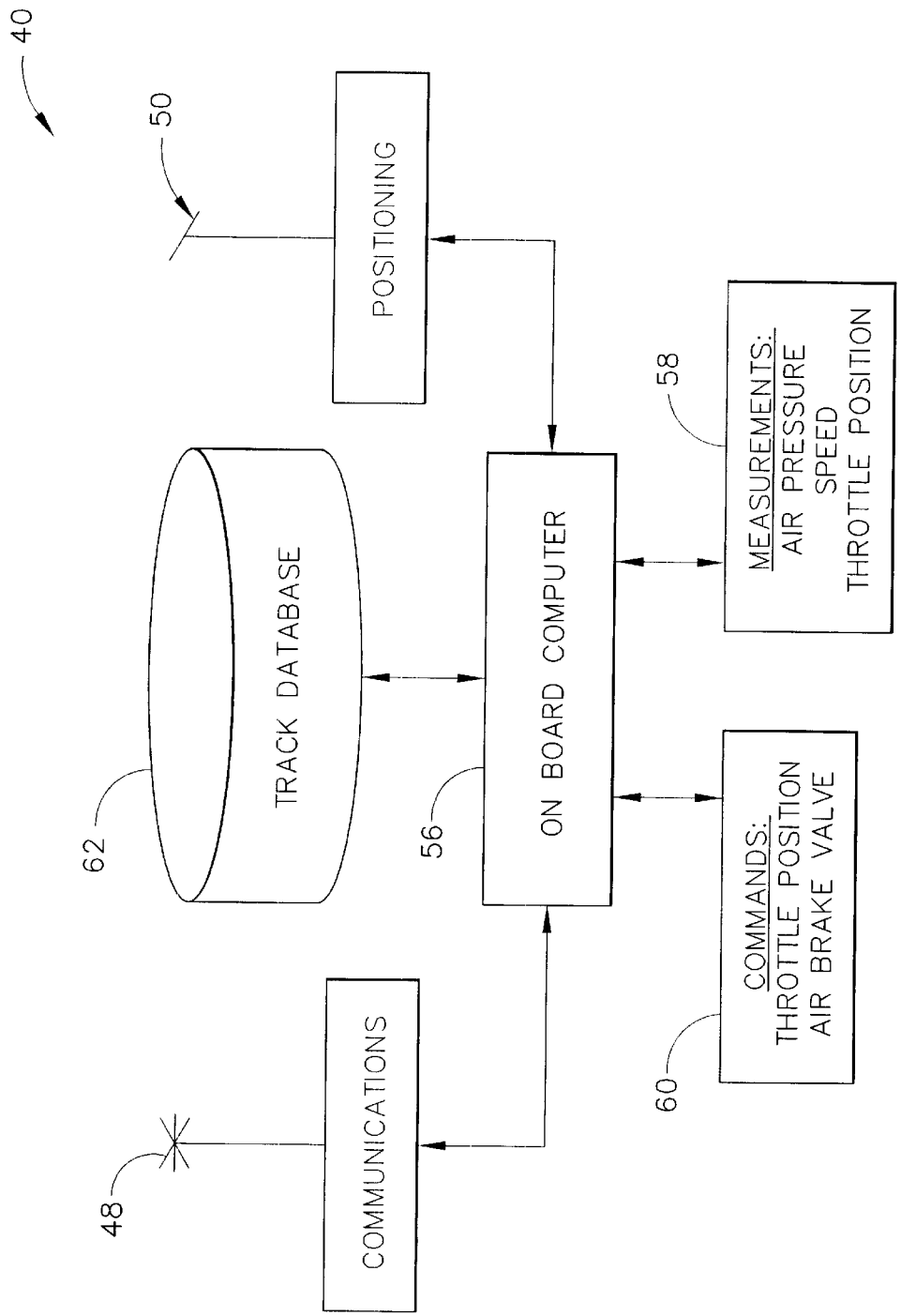
FIG. 3 is a block diagram of the train operating system illustrated in FIG. 2.

Referring to FIG. 3, each above-described on-board processor, e.g. computer 56, interfaces with locomotive speed controls, e.g. measurement controls 58 and command controls 60. Computer 56 also interfaces with communications system 48, positioning system 50, and a track database 62. Track database 62 is located, for example, at dispatching center 52 and is accessible by computer 56 via communications system 48.

In operation, train operating system 40 regulates train movement in the following manner. Lead train 12 is engineer-operated while other trains 14, 16 and 42 are, for example, operated automatically using known automation equipment. Before a trip is begun, applicable track speed restrictions, e.g. for exit switches, temporary bridges, town crossings and track work, are downloaded, e.g. from track database 62, to each computer 56 for each locomotive 44 (shown in FIG. 2). Alternatively, a computer (not shown) at a rail yard downloads track speed restriction information to computers 56 and also, in one embodiment, to track database 62.

Although each locomotive 44 observes downloaded track speed restrictions via train operating system 40, track signals are observed by lead train 12 (shown in FIG. 2) alone, via a train engineer. In one embodiment, during the course of the trip, track speed restrictions are updated, e.g. from track database 62 via communications system 48, to each computer 56 for each locomotive 44.

During train travel, computer 56 for each locomotive 44 periodically determines current position of locomotive 44 using positional information transmitted to computer 56 by positioning system 50. Computer 56 also collects on-board data 58 representative of, for example, brake air pressure, throttle position and locomotive speed. Each locomotive 44, via computer 56 and communications system 48, then transmits a report of its current position and speed to dispatching center 52, where the information is logged and processed.

Each computer 56 receives from dispatching center 52 reports of position and speed of a following train locomotive 44 and (except in the case of locomotive 44 of lead train 12) position and speed of a preceding train locomotive 44. Speeds of locomotives 44 following lead train 12 then are varied, i.e. increased or decreased, as described above, to minimize excess distances (such as distances 26 and 36) between trains 12, 14, 16 and 42.

More specifically, position and speed of a preceding locomotive 44, e.g. locomotive 44 of train 12, is reported by dispatching center 52 to computer 56 of, e.g. following train 14 (shown in FIG. 2). Computer 56 of train 14 determines safe braking distance 20 and guard distance 22 (shown in FIG. 1) between trains 12 and 14 at their current speeds and positions. Guard distance 22 in one embodiment includes a distance to accommodate time for transmitting position and speed information via train operating system 40. Computer 56 then determines excess distance 26 (shown in FIG. 1) based on safe braking distance 20 (shown in FIG. 1) and guard distance 22. Computer 56 then performs commands 60 to adjust throttle position or an air brake valve on locomotive 44. The speed of train 14 thus is varied to minimize excess distance 26 between trains 12 and 14.

In a similar manner, computer 56 of train 14 receives from dispatching center 52 a report of the position and speed of following train 16 (shown in FIG. 1), and computer 56 of train 14 determines excess distance 36 (shown in FIG. 1) between trains 14 and 16. Computer 56 uses excess distance 36 between trains 14 and 16 to compute a time when a subsequent report of the position and speed of train 14 is to be generated and transmitted to dispatching center 52. Thus computer 56 for train 14 reports the speed and position of train 14 to dispatching center 52, for transmission to train 16, at intervals based on how quickly train 16 approaches train 14.

Since trains 14, 16, and 42 (shown in FIG. 2) have speeds based upon lead train speed, dispatching center 52, except as described above, treats convoy 10 as one long stretchable train. A track section is assigned to lead train 12 and is released when the last train in convoy 10, e.g. train 42, has left the track section. In one embodiment trains 12, 14, 16 and 42 start to move in sequence from parallel tracks, thus reducing total locomotive usage time and total travel time.

As described above, SBDs are determined at various times for trains in motion in convoy 10. A factor used in determining a SBD, i.e. distributed train weight, is estimated adaptively in accordance with one embodiment of the present invention. A method for estimating distributed weight of, e.g., train 14 during travel includes measuring at various times the tractive effort, acceleration and, as described above, velocity (speed) and location (position) of train 14. Acceleration, velocity and position of train 14 are obtained, for example, using positioning system 50. In another embodiment other measurement devices, e.g. tachometers, are used.

In a further embodiment, track grade and track curvature, as functions of track location, are maintained on track database 62. A length, a number of cars and a number of axles for train 14 also are stored in track database 62. In an alternative embodiment, front and rear positions of train 14 and track curvature are obtained using positioning system 50. The foregoing quantities then are used to determine the length of train 14, from which are estimated the numbers of cars and axles in train 14.

At any instant during motion of train 14, a grade force is defined in accordance with:

$$\text{Grade\_force} = \sum_{\text{number\_of\_cars}} \theta_i w_i$$

where $\theta_i$ represents a grade under an $i^{th}$ car and $w_i$ represents a weight in tons of the $i^{th}$ car. Similarly, a curve force is defined in accordance with:

$$\text{Curve\_force} = \Sigma 0.170 \phi_i w_i$$

where $\theta_i$ represents track curvature at the $i^{th}$ car location. In addition, a Davis equation force is defined in accordance with:

$$\text{Davis\_force\_(in\_pounds)} = \sum_{\text{number\_of\_cars}} \left[ (1.5 + 0.03v)w_i + 18N_i + \frac{C_i a_i v^2}{10^4} \right]$$

where $\theta_i$ represents the velocity of train 14, $N_i$ represents a number of axles on the $i^{th}$ car, $C_i$ represents a known or approximated streamlining coefficient, and $a_i$ represents a known or approximated cross-sectional area of the $i^{th}$ car.

The foregoing values are substituted into a force balance equation of the following form:

$$(M)(A) = (\text{Tractive\_effort}) - (\text{Grade\_force}) - (\text{Curve\_force}) - (\text{Davis\_force})$$

where M represents the mass of train 14 and A represents the acceleration of train 14. The foregoing equation is rewritten in the following form:

$$A + \left(\sum 18N_i + \frac{C_i a_i v^2}{10^4}\right) = \frac{Te}{M} - \sum_{\text{number\_of\_cars}} (\theta_i + 0.17\phi_i + 1.5 + 0.03v)\frac{w_i}{M}$$

where Te represents the tractive effort of train 14. The foregoing equation is computed at each measurement cycle and is stated in terms of unknown values 1/M and $w_i/M$.

The unknown values then are solved for in such a way as to minimize a mean square error associated with the foregoing measurements and assumptions. That is, the foregoing values are equated as follows:

$$\underbrace{\left[A + \sum 18N_i + \frac{C_i a_i v^2}{10^4}\right]}_{y} = \underbrace{\begin{bmatrix} Te^1 & b_1^1 & b_2^1 & \cdots & b_n^1 \\ Te^2 & b_1^2 & b_2^2 & \cdots & b_n^2 \\ & & \vdots & & \end{bmatrix}}_{A} \underbrace{\begin{bmatrix} \frac{1}{M} \\ \frac{w_1}{M} \\ \frac{w_2}{M} \\ \vdots \\ \frac{w_n}{M} \end{bmatrix}}_{y} + \text{Error}$$

where:

$b_{i=\theta_i} + 0.17\phi_i + 1.5 + 0.03v$ and n represents a number of cars in train 14.

The solution to the above equation is written as:

$x = (A^T A)^{-1} A^T y$ subject to the constraint $$\sum \frac{w_i}{M} = g.$$

In one embodiment the preceding equation is implemented to estimate a distributed weight for each car of train 14 individually. However, since the track grade and curvature change slowly, in another embodiment train 14 is divided into blocks of, for example, ten cars each, thus entailing fewer computations for determining the total mass and weight distribution. The foregoing equation is solved, for example, recursively using computer 56, or in a batch calculation using a computer (not shown) located at, e.g. dispatching center 52.

The above-described method and system for very close following train movement provides a more profitable alternative to using long and very long trains. Fluidity of freight movement is increased, by increasing average travel speed and reducing classification time. Classification time is time used to determine destinations of individual rail cars and block them together. Since trains as described above are shorter than trains commonly in use, classification is simplified. As a result of generating a plurality of trains, for example, 12 and 14, instead of a single train, the above described method eliminates the need for power matching of locomotives and improves locomotive utilization. For example, instead of requiring a set of matching power locomotives for a single long train (which may not be currently available), each train 12 and 14 utilizes a locomotive which is currently available. Therefore, railroad locomotive utilization is improved.

The average travel time for a convoy of trains as described above is less than an average travel time for a long train having a number of cars equal to that of the convoy. Travel time can be reduced by as much as sixteen percent. Resulting reduction in track time usage provides a basis for increasing track utilization. Time also is reduced in rail yards, because smaller trains are easier to build and are moved more easily than long trains. Property loss also is reduced in the event of a derailment or other disaster, since trains not involved in the disaster can safely stop without suffering any loss. Further, stress on rail car couplers is reduced because the trains are shorter. Because close-following trains of shorter length than long trains are able to negotiate track restrictions in a shorter amount of time, fuel efficiency also is increased.

Although the above described exemplary embodiments include three and four trains, it is to be understood that any number of trains could be utilized. In addition, although it is explained that each train include one locomotive, it is contemplated that each train could include more than one locomotive.

While the invention has been described in terms of various specific embodiments, those skilled in the art will recognize that the invention can be practiced with modification within the spirit and scope of the claims.

What is claimed is:

1. A method for increasing efficiency of operation of trains wherein two successive trains in the sequence include a preceding train and a following train, said method comprising:

operating a plurality of trains as a moving sequence;
   determining a minimum safe distance based on a safe braking distance and a guard distance;
   varying speed of the following train based on the minimum safe distance between the following train and the preceding train; and
   regulating distances between the trains to eliminate distances in excess of the minimum safe distance between the trains.

2. A method in accordance with claim 1 wherein said step of determining a minimum safe distance comprises adding the safe braking distance and the guard distance to determine the minimum safe distance.

3. A method in accordance with claim 1 further comprising the step of determining the guard distance based on the safe braking distance.

4. A method in accordance with claim 1 further comprising the step of determining the guard distance based on data transmission rates of a train operating system implementing said method.

5. A method in accordance with claim 1 wherein any separation distance in excess of the minimum safe distance between the following train and the preceding train constitutes an excess distance, said method further comprises using positions and speeds of the two successive trains to determine the minimum safe distance and any excess distance between the two trains.

6. A method in accordance with claim 1 wherein the plurality of trains includes a lead train and following trains, said operating a plurality of trains as a moving sequence further comprises:

operating the lead train using an engineer;
   communicating to the following trains via a wireless communications link; and
   automating operation of the following trains based on data received from the wireless communications link.

7. A method in accordance with claim 6 wherein the trains are operated on tracks, said step of operating a plurality of trains further comprises the step of the lead train engineer observing track signals.

8. A method in accordance with claim 1 wherein the trains are operated on tracks, said operating a plurality of trains as a moving sequence comprises:
   determining track speed restrictions for the path of travel of the trains;
   communicating track speed restrictions to each of the plurality of trains; and
   observing, by each of the plurality of trains, the track speed restrictions.

9. A method in accordance with claim 8 wherein said communicating track speed restrictions comprises:
   downloading the speed restrictions to a computer for each train; and
   updating the speed restrictions during train operation.

10. A method in accordance with claim 1 wherein said operating a plurality of trains as a moving sequence comprises operating each train using a single locomotive on each train.

11. A method in accordance with claim 1 wherein said operating a plurality of trains as a moving sequence further comprises moving at least two of the trains into the sequence on a single track from positions on at least two generally parallel tracks.

12. A method in accordance with claim 1 wherein said regulating distances between the trains comprises determining the minimum safe distance between two successive trains at various times using reports of position and speed of the two trains.

13. A method for increasing efficiency of operation of trains wherein two successive trains in the sequence include a preceding train and a following train and any separation distance in excess of a minimum safe distance between the following train and the preceding train constitutes an excess distance, said method comprising:
   operating a plurality of trains as a moving sequence;
   determining current positions of the two successive trains using a positioning system;
   using the positions and speeds of the two successive trains to determine the minimum safe distance and any excess distance between the two trains;
   varying speed of the following train based on the minimum safe distance between the following train and the preceding train; and
   regulating distances between the trains to eliminate distances in excess of the minimum safe distance between the trains.

14. A method for increasing efficiency of operation of trains wherein two successive trains in the sequence include a preceding train and a following train and any separation distance in excess of a minimum safe distance between the following train and the preceding train constitutes an excess distance, said method comprising:
   operating a plurality of trains as a moving sequence;
   reporting current position and speed of the preceding train to the following train;
   using positions and speeds of the two successive trains to determine the minimum safe distance, based on a safe braking distance and a guard distance, and any excess distance between the two trains;
   varying speed of the following train based on the minimum safe distance between the following train and the preceding train; and
   regulating distances between the trains to eliminate distances in excess of the minimum safe distance between the trains.

15. A method for increasing efficiency of operation of trains wherein two successive trains in the sequence include a preceding train and a following train and any separation distance in excess of a minimum safe distance between the following train and the preceding train constitutes an excess distance, said method comprising:
   operating a plurality of trains as a moving sequence;
   reporting current position and speed of the following train to the preceding train;
   using the report to determine a time for a next report by the preceding train for transmission to the following train;
   using positions and speeds of the two successive trains to determine the minimum safe distance and any excess distance between the two trains;
   varying speed of the following train based on the minimum safe distance between the following train and the preceding train; and
   regulating distances between the trains to eliminate distances in excess of the minimum safe distance between the trains.

16. A method for increasing efficiency of operation of trains wherein two successive trains in the sequence include a preceding train and a following train and any separation distance in excess of a minimum safe distance between the following train and the preceding train constitutes an excess distance, said method comprising:
   operating a plurality of trains as a moving sequence;
   using position and speed of the following train to determine a distribution of weight of the following train;
   using positions and speeds of the two successive trains to determine the minimum safe distance and any excess distance between the two trains;
   varying speed of the following train based on the minimum safe distance between the following train and the preceding train; and
   regulating distances between the trains to eliminate distances in excess of the minimum safe distance between the trains.

17. A method in accordance with claim 16 wherein said step of using position and speed of the following train to determine a distribution of weight of the following train further comprises the steps of:
   determining a grade force in accordance with:

$$\text{Grade\_force} = \sum_{\text{number\_of\_cars}} \theta_i w_i$$

where $\theta_i$ represents a grade under an $i^{th}$ car and $w_i$ represents a weight in tons of the $i^{th}$ car;
   determining a curve force in accordance with:

$$\text{Curve\_force} = \Sigma 0.17 \phi_i w_i$$

where $\phi_i$ represents a track curvature at the $i^{th}$ car location; and
   determining a Davis equation force in accordance with:

$$\text{Davis\_force\_(in\_pounds)} = \sum_{\text{number\_of\_cars}} \left[ (1.5 + 0.03v) w_i + 18 N_i + \frac{C_i a_i v^2}{10^4} \right]$$

where v represents the speed of the following train, $N_i$ represents a number of axles on the $i^{th}$ car, $C_i$ represents a streamlining coefficient, and $a_i$ represents a cross-sectional area of the $i^{th}$ car.

18. A method in accordance with claim 17 further comprising the steps of:
   using track curvature and front and rear positions of the following train to determine a length of the following train; and
   using the train length to estimate the number of cars and the number of axles.

19. A method in accordance with claim 18 wherein said step of using track curvature and front and rear positions of the following train further comprises the step of obtaining the track curvature and front and rear positions using a positioning system.

20. A method in accordance with claim 17 further comprising the step of maintaining track curvature and grade in a track database.

21. A method for estimating distributed weight of a moving train including at least one car, the at least one car including a locomotive, said method comprising the steps of:
   at various times, using measurements of train tractive effort, speed and acceleration to estimate a plurality of frictional and aerodynamic forces affecting the train;
   at various times, relating the estimated forces to one another to obtain a matrix equation expressing the forces in terms of car weight and train weight; and
   solving the matrix equation to determine car weight and train weight.

22. A method in accordance with claim 21 wherein said step of using measurements of train tractive effort, speed and acceleration further comprises the steps of:
   at various times, determining current positions and speeds of the train using a positioning system; and
   at various times, determining a track grade using a track database.

23. A method in accordance with claim 22 further comprising the step of determining, at various times, a track curvature using the positioning system.

24. A method in accordance with claim 21 wherein said step of using measurements of train tractive effort, speed and acceleration comprises the steps of:
   determining a grade force in accordance with:

$$\text{Grade\_force} = \sum_{\text{number\_of\_cars}} \theta_i w_i$$

where $\theta_i$ represents a grade under an $i^{th}$ car and $w_i$ represents a weight in tons of the $i^{th}$ car;
   determining a curve force in accordance with:

$$\text{Curve\_force} = \Sigma 0.17 \phi_i w_i$$

where $\phi_i$ represents a track curvature at the $i^{th}$ car location; and
   determining a Davis equation force in accordance with:

$$\text{Davis\_force\_(in\_pounds)} = \sum_{\text{number\_of\_cars}} \left[ (1.5 + 0.03v)w_i + 18N_i + \frac{C_i a_i v^2}{10^4} \right]$$

where v represents the speed of the train, $N_i$ represents a number of axles on the $i^{th}$ car, $C_i$ represents a streamlining coefficient, and $a_i$ represents a cross-sectional area of the $i^{th}$ car.

25. A method in accordance with claim 24 further comprising the step of maintaining track grade and curvature, as functions of track location, in a track database.

26. A method in accordance with claim 24 wherein said step of relating the estimated forces to one another to obtain a matrix equation comprises the step of substituting the estimated forces into a force balance equation in accordance with:

$$(M)(A) = (\text{Tractive\_effort}) - (\text{Grade\_force}) - (\text{Curve\_force}) - (\text{Davis\_force})$$

where M represents a mass of the train and A represents the acceleration of the train.

27. A method in accordance with claim 26 further comprising the step of obtaining a matrix equation in accordance with:

$$A + \left( \sum 18N_i + \frac{C_i a_i v^2}{10^4} \right) = \frac{Te}{M} - \sum_{\text{number\_of\_cars}} (\theta_i + 0.17\phi_i + 1.5 + 0.03v) \frac{w_i}{M}$$

where Te represents the tractive effort of the train.

28. A method in accordance with claim 26 further comprising the step of minimizing a mean square error in accordance with:

$$\underbrace{\begin{bmatrix} A + \sum 18N_i + \frac{C_i a_i v^2}{10^4} \\ \vdots \end{bmatrix}}_{y} = \underbrace{\begin{bmatrix} Te^1 & b_1^1 & b_2^1 & \dots & b_n^1 \\ Te^2 & b_1^2 & b_2^2 & \dots & b_n^2 \\ & & \vdots & & \end{bmatrix}}_{A} \begin{bmatrix} \frac{1}{M} \\ \frac{w_1}{M} \\ \frac{w_2}{M} \\ \vdots \\ \frac{w_n}{M} \end{bmatrix}_{y} + \text{Error}$$

where:

$$b_i = \theta_i + 0.17\phi_i + 1.5 + 0.03v;$$

and
   n represents a number of cars in the train.

29. A method in accordance with claim 28 wherein the step of solving the matrix equation to determine car weight and train weight comprises the step of determining car weight and train weight in accordance with:

$$x = (A^T A)^{-1} A^T y$$

subject to a constraint $$\sum \frac{w_i}{M} = g.$$

30. A method in accordance with claim 29 wherein the train includes a plurality of cars, said method further comprising the steps of:
   dividing the train into blocks of cars; and
   reducing a number of computations for determining car weight and train weight.

31. A train operating system for operating a convoy of trains, wherein two successive trains in the convoy include a preceding train and a following train, said train operating system comprising:
   for each train, a processor configured to interface with speed controls of the train and determine a distance between two successive trains based on speeds and positions of the two successive trains;

a communications system configured to interface with each said processor; and a positioning system configured to interface with each said processor;

said train operating system configured to:
determine a minimum safe distance between the following train and the preceding train using distributed weight of one of the trains;
vary speed of the following train based on a minimum safe distance; and
eliminate distances in excess of safe minimum distances between the trains.

32. A train operating system in accordance with claim 31 further configured to determine distributed weight of one of the trains in accordance with:

$$\underbrace{\begin{bmatrix} A + \sum 18N_i + \frac{C_i a_i v^2}{10^4} \\ \vdots \end{bmatrix}}_{y} = \underbrace{\begin{bmatrix} Te^1 & b_1^1 & b_2^1 & \cdots & b_n^1 \\ Te^2 & b_1^2 & b_2^2 & \cdots & b_n^2 \\ & & \vdots & & \end{bmatrix}}_{A} \underbrace{\begin{bmatrix} \frac{1}{M} \\ \frac{w_1}{M} \\ \frac{w_2}{M} \\ \vdots \\ \frac{w_n}{M} \end{bmatrix}}_{x} + Error$$

where:

$b_i = \theta_i + 0.17\phi_i + 1.5 + 0.03v$, and where M represents a mass of the train, A represents an acceleration of the train, Te represents tractive effort of the train, $\theta_i$ represents a grade under an $i^{th}$ car of the train, $w_i$ represents a weight in tons of the $i^{th}$ car, $\phi_i$ represents a track curvature at a location of the $i^{th}$ car, v represents a speed of the train, $N_i$ represents a number of axles on the $i^{th}$ car, $C_i$ represents a streamlining coefficient, and $a_i$ represents a cross-sectional area of the $i^{th}$ car.

33. A train operating system for operating a convoy of trains, wherein two successive trains in the convoy include a preceding train and a following train, said train operating system comprising:

for each train, a processor configured to interface with speed controls of the train, determine a distance between two successive trains based on speeds and positions of the two successive trains, and determine a minimum safe distance between the following train and the preceding train based on a safe braking distance and a guard distance;

a communications system configured to interface with each said processor; and a positioning system configured to interface with each said processor;

said train operating system configured to:
vary speed of the following train based on a minimum safe distance; and
eliminate distances in excess of safe minimum distances between the trains.

34. A train operating system in accordance with claim 33 wherein said processor further configured to sum the safe braking distance and the guard distance to determine the minimum safe distance.

35. A train operating system in accordance with claim 33 wherein said processor further configured to determine the guard distance based on the safe braking distance.

36. A train operating system for operating a convoy of trains, wherein two successive trains in the convoy include a preceding train and a following train, said train operating system comprising:

for each train, a processor configured to interface with speed controls of the train and determine a distance between two successive trains based on speeds and positions of the two successive trains;

a communications system configured to interface with each said processor; and a positioning system configured to interface with each said processor;

said train operating system configured to:
vary speed of the following train based on a minimum safe distance between the following train and the preceding train;
vary speed to eliminate an excess distance between the following train and the preceding train; and
eliminate distances in excess of safe minimum distances between the trains.

37. A train operating system in accordance with claim 36 wherein said communications system further comprises a dispatching center configured to process reports from and to the trains.

38. A train operating system in accordance with claim 36 wherein said positioning system comprises a global positioning system.

39. A train operating system in accordance with claim 36 further comprising a track database configured to:

make available track speed restrictions to said processors; and update the restrictions during train travel.

40. A train operating system in accordance with claim 36 wherein said processor further configured to use a position and speed of the preceding train to determine the excess distance between the following train and the preceding train.

41. A train operating system for operating a convoy of trains, said train operating system comprising:

for each train, a processor configured to interface with speed controls of the train and determine a distance between two successive trains based on speeds and positions of the two successive trains;

a communications system configured to interface with each said processor and report train current positions and speeds to each said processor; and a positioning system configured to interface with each said processor, said train operating system configured to eliminate distances in excess of safe minimum distances between the trains.

42. A system for determining a safe braking distance for a train having at least one car moving on a track, said system comprising:

a positioning system and a processor, said positioning system configured to transmit information to said processor for determining a current position of the train, said processor configured to determine a braking distance using the current position of the train and distributed weight of the train; and a communications system and a track database, said communications system configured to transmit information between said track database and said processor for determining distributed weight of the train, said track database configured to maintain information as to track grade for transmission to said processor.

43. A system in accordance with claim 42 wherein said processor further configured to determine distributed weight of the train using measurements of train acceleration, speed and tractive effort.

44. A system in accordance with claim 43 said processor further configured to:
at various times, use the measurements of train tractive effort, speed and acceleration to estimate a plurality of frictional and aerodynamic forces affecting the train;
at various times, relate the estimated forces to one another to obtain a matrix equation expressing the forces in terms of car weight and train weight; and
solve the matrix equation to determine car weight and train weight.

45. A system in accordance with claim 44 wherein said processor further configured to:
at various times, determine current positions and speeds of the train using said positioning system; and
at various times, determine the track grade using said track database.

46. A system in accordance with claim 45 wherein said processor further configured to determine, at various times, a track curvature using said positioning system.

47. A system in accordance with claim 44 wherein said processor further configured to:
determine a grade force in accordance with:

$$\text{Grade\_force} = \sum_{\text{number\_of\_cars}} \theta_i w_i$$

where $\theta_i$ represents a grade under an $i^{th}$ car and $w_i$ represents a weight in tons of the $i^{th}$ car;
determine a curve force in accordance with:

$$\text{Curve\_force} = \Sigma 0.17 \phi_i w_i$$

where $\phi_i$ represents a track curvature at the $i^{th}$ car location; and
determine a Davis equation force in accordance with:

$$\text{Davis\_force\_(in\_pounds)} = \sum_{\text{number\_of\_cars}} \left[ (1.5 + 0.03v)w_i + 18N_i + \frac{C_i a_i v^2}{10^4} \right]$$

where v represents the speed of the train, $N_i$ represents a number of axles on the $i^{th}$ car, $C_i$ represents a streamlining coefficient, and $a_i$ represents a cross-sectional area of the $i^{th}$ car.

48. A system in accordance with claim 44 wherein said processor further configured to substitute the estimated forces into a force balance equation in accordance with:

$(M)(A)=(\text{Tractive\_effort})-(\text{Grade\_force})-(\text{Curve\_force})-(\text{Davis\_force})$ where M represents a mass of the train and A represents the acceleration of the train.

49. A system in accordance with claim 48 wherein said processor further configured to obtain a matrix equation in accordance with:

$$A + \left( \sum 18N_i + \frac{C_i a_i v^2}{10^4} \right) = \frac{Te}{M} - \sum_{\text{number\_of\_cars}} (\theta_i + 0.17\phi_i + 1.5 + 0.03v)\frac{w_i}{M}$$

where Te represents the tractive effort of the train.

50. A system in accordance with claim 49 wherein said processor further configured to minimize a mean square error in accordance with:

$$\underbrace{\left[ A + \sum 18N_i + \frac{C_i a_i v^2}{10^4} \right]}_{y} = \underbrace{\begin{bmatrix} Te^1 & b_1^1 & b_2^1 & \cdots & b_n^1 \\ Te^2 & b_1^2 & b_2^2 & \cdots & b_n^2 \\ \vdots & & & & \end{bmatrix}}_{A} \underbrace{\begin{bmatrix} \frac{1}{M} \\ \frac{w_1}{M} \\ \frac{w_2}{M} \\ \vdots \\ \frac{w_n}{M} \end{bmatrix}}_{x} + Error$$

where:

$b_i = \theta_i + 0.17\phi_i + 1.5 + 0.03v;$ and n represents a number of cars in the train.

51. A system in accordance with claim 50 wherein said processor further configured to determine car weight and train weight in accordance with:

$x = (A^T A)^{-1} A^T y$ subject to a constraint $$\sum \frac{w_i}{M} = g.$$

52. A system in accordance with claim 51 wherein the train includes a plurality of cars, said processor further configured to:
divide the train into blocks of cars; and
reduce a number of computations for determining car weight and train weight.

53. A system in accordance with claim 42 wherein said track database further configured to maintain track grade and curvature as functions of track location.

* * * * *

UNITED STATES PATENT AND TRADEMARK OFFICE
CERTIFICATE OF CORRECTION

PATENT NO. : 6,580,976 B1  
DATED : June 17, 2003  
INVENTOR(S) : John Martin Belcea It is certified that error appears in the above-identified patent and that said Letters Patent is hereby corrected as shown below:

<u>Column 10,</u>
Line 30, delete equation, insert therefor equation as submitted:

$$-\underbrace{\begin{bmatrix} A + \sum 18N_i + \dfrac{C_i a_i v^2}{10^4} \\ " \\ " \\ " \\ " \\ " \\ " \end{bmatrix}}_{y} = \underbrace{\begin{bmatrix} Te^1 & b_1^{\,1} & b_2^{\,1} & \ldots & b_n^{\,1} \\ Te^2 & b_1^{\,2} & b_2^{\,2} & \ldots & b_n^{\,2} \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error --$$

<u>Column 11,</u>
Line 20, delete equation, insert therefor equation as submitted:

$$-\underbrace{\begin{bmatrix} A + \sum 18N_i + \dfrac{C_i a_i v^2}{10^4} \\ " \\ " \\ " \\ " \\ " \\ " \end{bmatrix}}_{y} = \underbrace{\begin{bmatrix} Te^1 & b_1^{\,1} & b_2^{\,1} & \ldots & b_n^{\,1} \\ Te^2 & b_1^{\,2} & b_2^{\,2} & \ldots & b_n^{\,2} \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error --$$

UNITED STATES PATENT AND TRADEMARK OFFICE
CERTIFICATE OF CORRECTION

PATENT NO. : 6,580,976 B1
DATED : June 17, 2003
INVENTOR(S) : John Martin Belcea It is certified that error appears in the above-identified patent and that said Letters Patent is hereby corrected as shown below:

<u>Column 14,</u>
Line 20, delete equation, insert therefor equation as submitted:

$$-- \underbrace{\begin{bmatrix} A+\sum 18N_i + \dfrac{C_i a_i v^2}{10^4} \\ '' \\ '' \\ '' \\ '' \\ '' \\ '' \end{bmatrix}}_{y} = \underbrace{\begin{bmatrix} Te^1 & b_1^1 & b_2^1 & \ldots & b_n^1 \\ Te^2 & b_1^2 & b_2^2 & \ldots & b_n^2 \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error \ --.$$

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,580,976 B1  
DATED : June 17, 2003  
INVENTOR(S) : John Martin Belcea Page 1 of 2

It is certified that error appears in the above-identified patent and that said Letters Patent is hereby corrected as shown below:

Column 10,
Line 30, delete equation, insert therefor equation as submitted.

$$\underbrace{\begin{bmatrix} A+\sum 18N_i + \dfrac{C_i a_i v^2}{10^4} \\ " \\ " \\ " \\ " \\ " \\ " \end{bmatrix}}_{y} = \underbrace{\begin{bmatrix} Te^1 & b_1^{\,1} & b_2^{\,1} & \ldots & b_n^{\,1} \\ Te^2 & b_1^{\,2} & b_2^{\,2} & \ldots & b_n^{\,2} \\ & & \cdot & & \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error$$

Column 11,
Line 20, delete equation, insert therefor equation as submitted.

$$\underbrace{\begin{bmatrix} A+\sum 18N_i + \dfrac{C_i a_i v^2}{10^4} \\ " \\ " \\ " \\ " \\ " \\ " \end{bmatrix}}_{y} = \underbrace{\begin{bmatrix} Te^1 & b_1^{\,1} & b_2^{\,1} & \ldots & b_n^{\,1} \\ Te^2 & b_1^{\,2} & b_2^{\,2} & \ldots & b_n^{\,2} \\ & & \cdot & & \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error$$

UNITED STATES PATENT AND TRADEMARK OFFICE
CERTIFICATE OF CORRECTION

PATENT NO. : 6,580,976 B1
DATED : June 17, 2003
INVENTOR(S) : John Martin Belcea It is certified that error appears in the above-identified patent and that said Letters Patent is hereby corrected as shown below:

Column 14,
Line 20, delete equation, insert therefor equation as submitted.

$$\underbrace{\begin{bmatrix} A + \sum 18N_i + \dfrac{C_i a_i v^2}{10^4} \\ " \\ " \\ " \\ " \\ " \\ " \end{bmatrix}}_{y} = \underbrace{\begin{bmatrix} Te^1 & b_1^{\,1} & b_2^{\,1} & \ldots & b_n^{\,1} \\ Te^2 & b_1^{\,2} & b_2^{\,2} & \ldots & b_n^{\,2} \\ & & \cdot & & \\ & & \cdot & & \\ & & \cdot & & \\ & & \cdot & & \\ & & \cdot & & \end{bmatrix}}_{A} \underbrace{\begin{bmatrix} \dfrac{1}{M} \\ \dfrac{w_1}{M} \\ \dfrac{w_2}{M} \\ \cdot \\ \cdot \\ \cdot \\ \dfrac{w_n}{M} \end{bmatrix}}_{x} + Error$$

Signed and Sealed this

Twenty-fifth Day of November, 2003

JAMES E. ROGAN
*Director of the United States Patent and Trademark Office*